United States Patent
Liebherr et al.

(10) Patent No.: US 7,722,493 B2
(45) Date of Patent: May 25, 2010

(54) POWER-BRANCHED TRANSMISSION AND METHOD FOR THE OPERATION OF SUCH A TRANSMISSION

(75) Inventors: Markus Liebherr, Bulle (CH); Josef Häglsperger, Gangkofen (DE); Peter Dziuba, Frickingen-Altheim (DE); Josef Bauer, Nandlstadt (DE); Manfred Kirchhoff, Eggersdorf (DE)

(73) Assignee: Mali Holding AG, Fribourg (CH)

( * ) Notice: Subject to any disclaimer, the term of this patent is extended or adjusted under 35 U.S.C. 154(b) by 481 days.

(21) Appl. No.: 11/665,788

(22) PCT Filed: Oct. 20, 2005

(86) PCT No.: PCT/CH2005/000612

§ 371 (c)(1),
(2), (4) Date: Apr. 19, 2007

(87) PCT Pub. No.: WO2006/042434

PCT Pub. Date: Apr. 27, 2006

(65) Prior Publication Data
US 2008/0214349 A1 Sep. 4, 2008

(30) Foreign Application Priority Data
Oct. 20, 2004 (CH) .................................. 1733/04

(51) Int. Cl.
*F16H 47/06* (2006.01)

(52) U.S. Cl. ......................................... 475/80; 475/115
(58) Field of Classification Search .................. 475/70, 475/79, 80, 115
See application file for complete search history.

(56) References Cited

U.S. PATENT DOCUMENTS

| | | | |
|---|---|---|---|
| 3,990,327 A | 11/1976 | Margolin | |
| 4,279,194 A | 7/1981 | Brighigna | |
| 4,286,477 A | 9/1981 | Meyerle et al. | |
| 4,446,756 A | 5/1984 | Hagin et al. | |
| 4,778,020 A | 10/1988 | Hagin et al. | |
| 4,843,907 A | 7/1989 | Hagin et al. | |
| 4,976,665 A | 12/1990 | Hagin et al. | |
| 5,584,772 A | 12/1996 | Hayd | |

(Continued)

FOREIGN PATENT DOCUMENTS

DE 27 57 300 A1 6/1979

(Continued)

*Primary Examiner*—Ha D. Ho
(74) *Attorney, Agent, or Firm*—The Webb Law Firm

(57) ABSTRACT

A power-branched transmission, particularly for agricultural vehicles such as tractors or similar, includes a stepped planetary gear which is disposed between an input shaft and an output shaft and is used for dividing the power supplied at the input shaft onto a mechanical power branch and a hydraulic power branch. The hydraulic power branch is formed by two hydraulically interconnected, identical hydrostatic axial piston engines which can be selectively operated as a pump or an engine, can be swiveled within a predefined pivoting angle, and can be connected to the input shaft or the stepped planetary gear in a different manner via two respective clutches so as to cover different operating ranges or running steps. In order to obtain better efficiency in such a power-branched transmission, the two hydrostatic axial piston engines are configured as wide-angle hydrostats that are provided with a minimum pivoting angle range of 45°.

27 Claims, 11 Drawing Sheets

U.S. PATENT DOCUMENTS

| | | | |
|---|---|---|---|
| 5,643,121 A * | 7/1997 | Greenwood et al. | 475/72 |
| 5,766,107 A | 6/1998 | Englisch | |
| 7,241,242 B2 * | 7/2007 | Schmidt | 475/72 |
| 7,303,498 B2 * | 12/2007 | Ishii et al. | 475/72 |
| 7,335,125 B2 * | 2/2008 | McCrary | 475/72 |
| 7,416,502 B2 * | 8/2008 | Ulbrich | 475/72 |
| 2003/0008745 A1 | 1/2003 | Heindl | |
| 2004/0173089 A1 | 9/2004 | Gray, Jr. et al. | |

FOREIGN PATENT DOCUMENTS

| | | |
|---|---|---|
| DE | 29 04 572 A1 | 8/1980 |
| DE | 29 50 619 A1 | 6/1981 |
| DE | 3707382 | 9/1988 |
| DE | 37 26 080 A1 | 2/1989 |
| DE | 3912369 | 10/1990 |
| DE | 3912386 | 10/1990 |
| DE | 4010919 | 10/1991 |
| DE | 4343401 | 4/1994 |
| DE | 4343402 | 4/1994 |
| EP | 0 249 001 A1 | 4/1987 |
| EP | 1 273 828 A2 | 1/2003 |

* cited by examiner

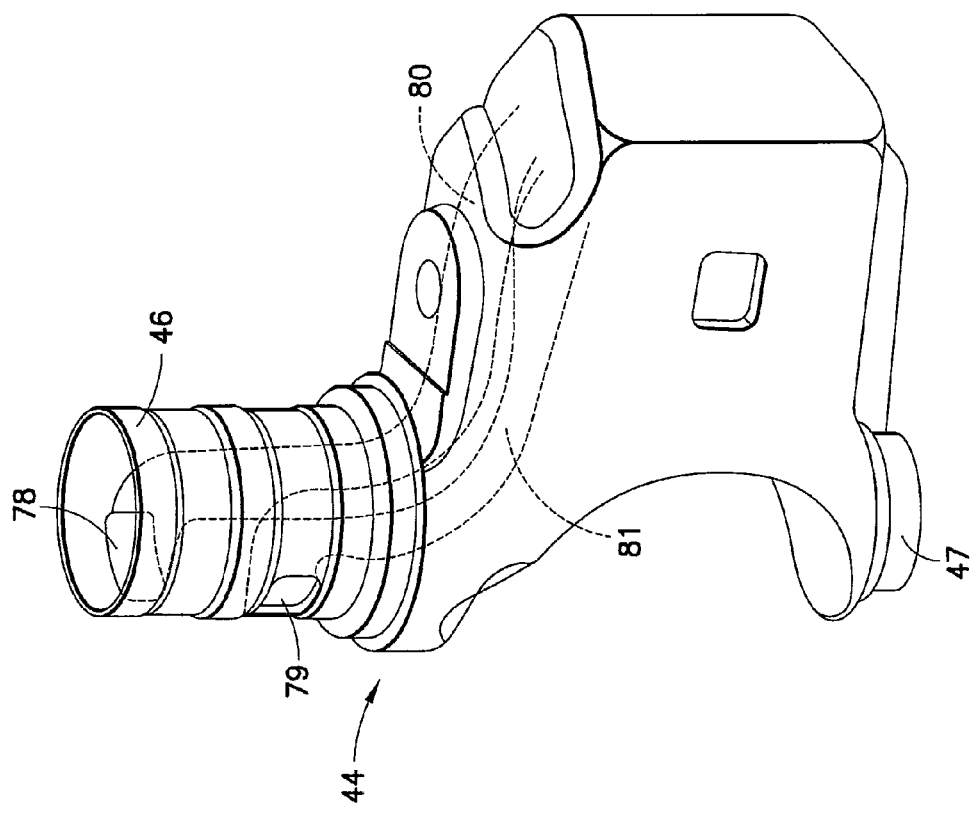
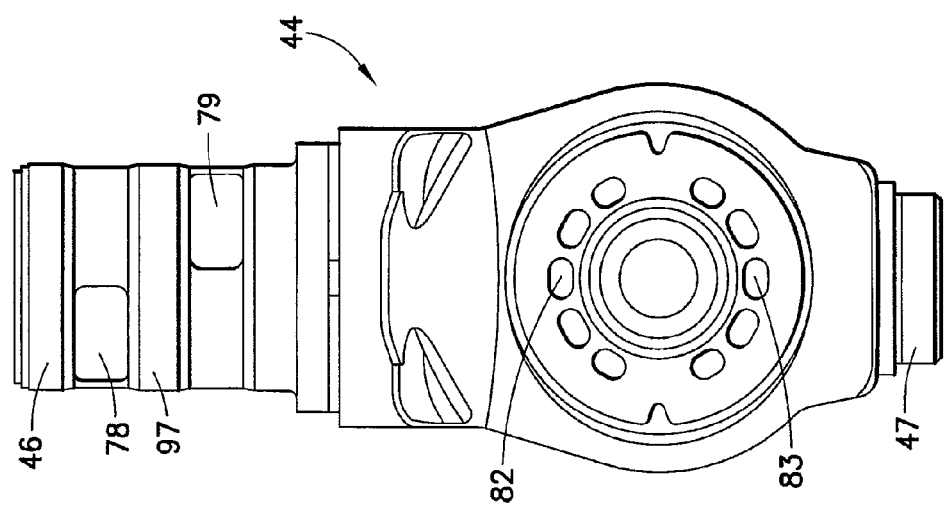

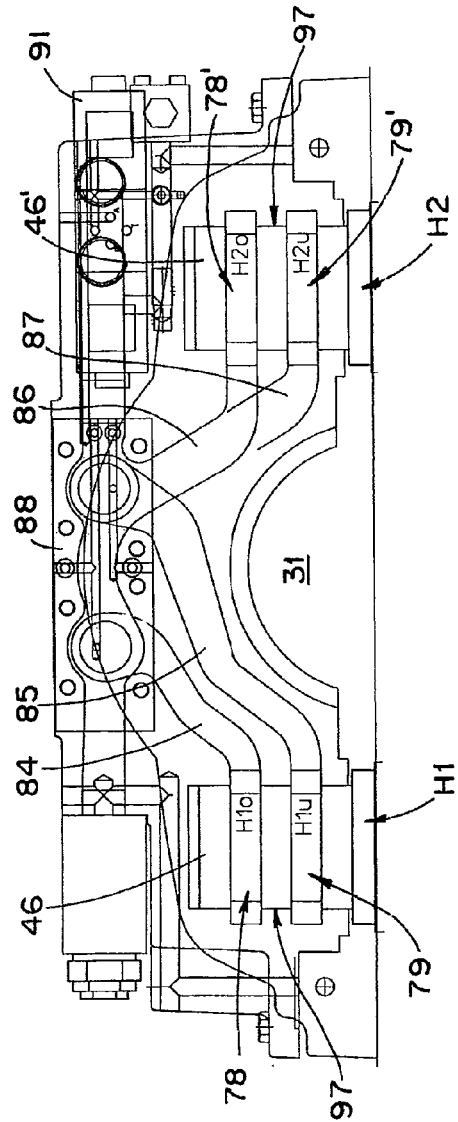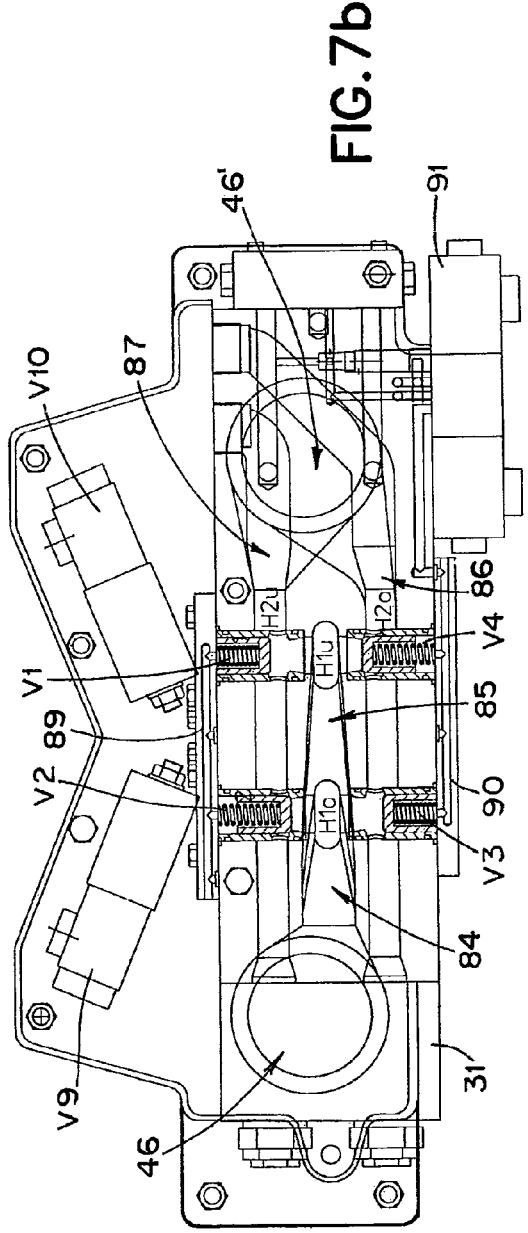
FIG.7a
FIG.7b

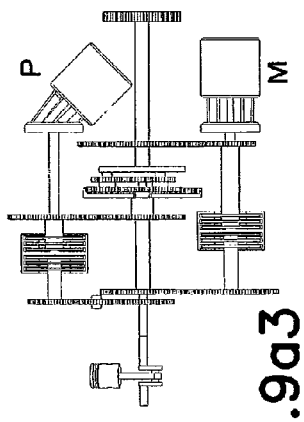
FIG.9a3
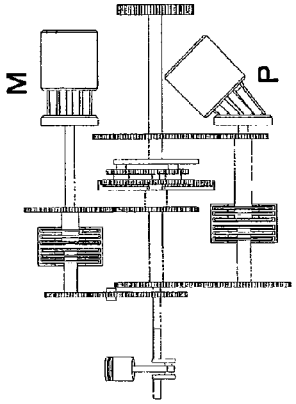
FIG.9b3
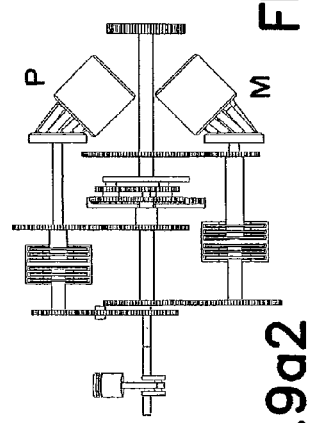
FIG.9a2
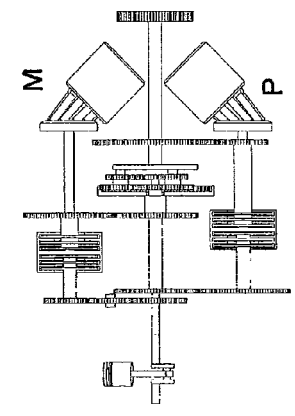
FIG.9b2
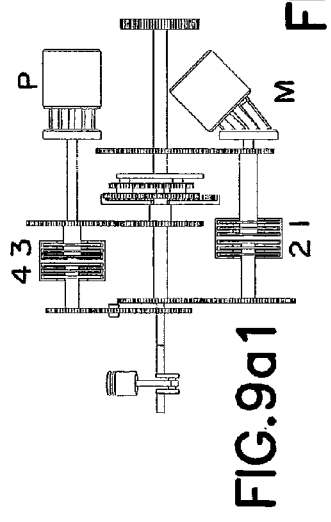
FIG.9a1
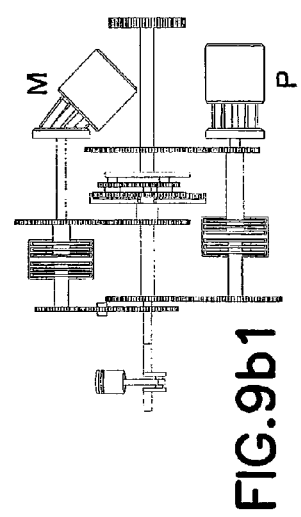
FIG.9b1
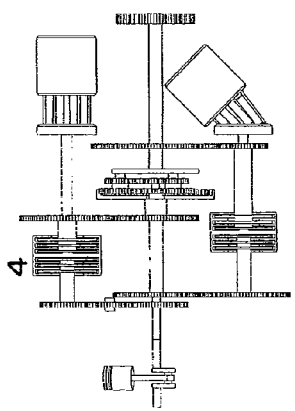
FIG.9c

POWER-BRANCHED TRANSMISSION AND METHOD FOR THE OPERATION OF SUCH A TRANSMISSION

BACKGROUND OF THE INVENTION

1. Field of the Invention

The present invention relates to the field of vehicle transmissions. It refers to a power-branched transmission, in particular for agricultural vehicles, such as tractors or the like, and to a method for the operation of such a transmission.

2. Description of Related Art

Power-branched transmissions, particularly for use in vehicles employed for agricultural or construction purposes, such as, for example tractors, have been known for a long time. In such power-branched transmissions, the power prevailing at an input shaft or drive shaft and normally output by an internal combustion engine is apportioned to a first mechanical power branch with a fixed ratio and to a second power branch of continuously variable ratio and is subsequently combined again in order to be available at an output shaft or take-off shaft. The second power branch is mostly designed as a hydrostatic branch, in which two hydrostatic axial piston machines (hydrostats) of the oblique axis or swashplate type, which are connected hydraulically to one another, operate selectively as a pump or as a motor. The ratio can in this case be varied by a variation in the pivot angle of the cylinder block or of the swashplate. Apportioning the power to the two power branches and combining the branched powers normally take place by means of a planetary gear. Power-branched transmissions of the type described are disclosed in various embodiments in DE-A1-27 57 300, DE-C2-29 04 572, DE-A1-29 50 619, DE-A1-37 07 382, DE-A1-37 26 080, DE-A1-39 12 369, DE-A1-39 12 386, DE-A1-43 43 401, DE-A1-43 43 402, EP-B1-0 249 001 and EP-A2-1 273 828.

So that a power-branched transmission can be used successfully in practice, it should generally be distinguished by the following properties:

The transmission should have high efficiency over the entire speed range. This should be the case particularly at the high driving speeds which occur in road traction over a lengthy period of time.

The transmission should have a compact construction, in order to allow installation in the most diverse possible vehicles, if possible without structural restrictions.

The transmission should make it possible to transfer high powers.

The transmission should have as simple a construction as possible in order to limit the power losses and increase operating reliability.

The transmission should allow fully comprehensive electronic control in connection with engine management and, even in the event of a failure of specific control elements, make sufficient emergency driving programs available.

In DE-A1-43 43 402 initially mentioned, a power-branched transmission designated as an SHL transmission (continuously variable hydrostatic power-branched transmission) has already been described, distinguished by two hydraulically coupled identical hydrostats in the oblique-axis type of construction which can be coupled in different ways to a planetary differential gear via pairs of clutches or selective shift elements K1/K2 or K3/K4. The known SHL transmission has been used and tested in town buses under the type designation SHL-Z. The two hydrostats used have a pivoting range of only 0-25°. For forward drive, in this case, there are 3 driving steps or driving ranges: in the first driving range, at the starting point, the hydrostatic fraction of the transferred power is 100% and then approaches zero linearly with the speed. In the second driving range, it goes from zero to a maximum of about 27% and then back to zero again. In the third driving range, it goes from zero to a maximum value of 13% at the highest forward speed.

The known SHL transmission has the disadvantages not only of the subdivision of the forward drive into three driving ranges, which leads to an increased outlay in shift and control terms but, above all, of the hydrostatic power transfer fraction which deviates markedly from zero at maximum speed. This leads, on long-distance trips in which the high speeds are maintained virtually constantly over a lengthy period of time, to unnecessary efficiency losses which have an adverse effect on consumption and on exhaust gas emission.

The object of the invention, therefore, is to provide a continuously variable hydrostatic power-branched transmission which avoids the disadvantages of known transmissions and which is distinguished, in particular, by high and improved efficiency in rapid forward drive, and also to specify a method for the operation of such a transmission.

SUMMARY OF THE INVENTION

The essence of the invention is, in the transmission configuration described initially, to design the two hydrostatic axial piston machines as wide-angle hydrostats with a pivot angle range of at least 45° and to carry out the adjustment of the angles of the hydrostatic piston machines, the hydraulic connection between the two hydrostatic axial piston machines and the activation of the clutches in such a way that forward drive is subdivided into two successive driving ranges, and in such a way that the fraction of the power transferred over the hydraulic branch in each case approaches zero at the end of each of the two driving ranges. This measure achieves, at high speeds, a vanishing hydrostatic fraction of the power transfer which is manifested at the same time in markedly improved efficiency. The operating values are particularly favorable when, according to a preferred refinement, the two hydrostatic axial piston machines have a pivot angle range of at least 50°.

A preferred refinement of the transmission according to the invention is characterized in that the stepped planetary gear comprises double planet wheels mounted rotatably on a planet web and having a smaller gearwheel and a larger gearwheel which mesh with a larger sun wheel and with a smaller sun wheel and which run with the larger gearwheel in a ring wheel, in that the larger sun wheel is coupled to the input shaft, in that the first hydrostatic axial piston machine can be coupled to the ring wheel via a first clutch and to the input shaft via a second clutch, in that the second hydrostatic axial piston machine can be coupled to the planet web via a third clutch and to the smaller sun wheel via a fourth clutch, in that the output shaft is coupled to the planet web, in that the larger sun wheel is seated fixedly in terms of rotation on the input shaft, in that a first spur wheel is flanged to the planet web, and in that a second spur wheel, which meshes with the first spur wheel, is arranged fixedly in terms of rotation on the output shaft.

In particular, the power-branched transmission is characterized in that a third spur wheel is flanged to the ring wheel and the coupling of the first hydrostatic axial piston machine by means of the first clutch takes place via a fourth spur wheel which meshes with the third spur wheel, in that a fifth spur wheel is arranged fixedly in terms of rotation on the input shaft and the coupling of the first hydrostatic axial piston machine by means of the second clutch takes place via a sixth spur wheel and a reversing wheel which meshes with the fifth spur wheel and with the sixth spur wheel, in that the coupling of the second hydrostatic axial piston machine by means of the third clutch takes place via a seventh spur wheel which meshes with the first spur wheel, and in that the smaller sun wheel is connected fixedly in terms of rotation to an eighth spur wheel via a hollow shaft surrounding the input shaft, and the coupling of the second hydrostatic axial piston machine by means of the fourth clutch takes place via a ninth spur wheel which meshes with the eighth spur wheel.

The power-branched transmission becomes particularly compact when the input shaft is connected fixedly in terms of rotation to a coaxial take-off shaft which passes through the power-branched transmission.

The hydrostatic axial piston machines are preferably equipped in each case with a driven shaft, the clutches are designed as hydraulically actuable multiple-disk clutches and arranged on the driven shafts, and the clutches are actuated via axial hydraulic ducts running in the driven shafts.

Preferably the input shaft, the stepped planetary gear, the two hydrostatic axial piston machines and the output shaft are accommodated in a space-saving way in a common housing, the two hydrostatic axial piston machines being hydraulically connectable to one another via high-pressure ducts running in the housing. The housing comprises a housing lower part and a housing upper part, on the housing upper part is arranged a high-pressure block in which the high-pressure ducts are accommodated, the two hydrostatic axial piston machines in each case comprise a cylinder block with a plurality of cylinder bores and with pistons mounted displaceably therein, which cylinder block is mounted in a pivot housing rotatably about a horizontal axis, the pivot housings are mounted in each case with an upper bearing journal in the high-pressure block pivotably about a vertical pivot axis, and the cylinder bores are connected to the high-pressure ducts in the high-pressure block via connecting ducts running in the pivot housing into the upper bearing journals.

In particular, in each of the two hydrostatic axial piston machines, the cylinder bores of the cylinder block which lie above a horizontal mid-plane can be connected to an upper connecting duct via upper orifices in the pivot housing and the cylinder bores of the cylinder block which lie below the horizontal mid-plane can be connected to a lower connecting duct via lower orifices in the pivot housing, the upper connecting ducts being connected to first high-pressure ducts and the lower connecting ducts to second high-pressure ducts in the high-pressure block, and the first and the second high-pressure ducts being selectively connectable to one another by means of valves accommodated in the high-pressure block.

The power-branched transmission is particularly compact and operationally reliable when the first and second high-pressure ducts in the high-pressure block are produced by casting and when the valves are designed as hydraulically actuable valves and are accommodated in bores which are introduced into the high-pressure block transversely to the high-pressure ducts. The hydraulically actuable valves are, in particular, activated in pairs via first electromagnetic valves.

Good emergency driving properties arise when, for redundancy reasons, a second electromagnetic valve is in each case connected in parallel to the first electromagnetic valves or an electromagnetic equivalent coil is assigned to the latter.

A pivot bolt is preferably arranged in each case on the pivot housings of the hydrostatic axial piston machines at a predetermined radial distance from the upper bearing journal, and hydraulic cylinders are provided on the housing upper part, and engage on the pivot bolts in order to pivot the pivot housings. The hydraulic cylinders are activated via third electro-magnetic valves, and, for redundancy reasons, the third electromagnetic valves are assigned in each case an electromagnetic equivalent coil.

The clutches are activated via electromagnetic valves, the electromagnetic valves are accommodated in valve plates flanged to the housing, and the hydraulic connection between the electromagnetic valves and the clutches takes place via ducts running in the housing, one of the clutches being provided for coupling the second hydrostatic axial piston machine to the output shaft, and, for redundancy reasons, a further electro-magnetic valve is connected in parallel to the electromagnetic valve assigned to this clutch.

A preferred refinement of the method according to the invention is distinguished in that the stepped planetary gear comprises double planet wheels mounted rotatably on a planet web and having a smaller gearwheel and a larger gearwheel which mesh with a larger sun wheel and with a smaller sun wheel and which run with the larger gearwheel in a ring wheel, in that the larger sun wheel is coupled to the input shaft and the output shaft is coupled to the planet web, in that, in the first driving range, the first hydrostatic axial piston machine is coupled to the ring wheel via a first clutch and the second hydrostatic axial piston machine is coupled to the planet web via a second clutch, and the first hydrostatic axial piston machine is operated as a pump and the second hydrostatic axial piston machine as a motor, and in that, in the second driving range, the first hydrostatic axial piston machine is coupled to the ring wheel via the first clutch and the second hydrostatic axial piston machine is coupled to the smaller sun wheel via a third clutch, and the first hydrostatic axial piston machine is operated as a motor and the second hydrostatic axial piston machine as a pump.

In particular, to run through the first driving range, the first hydrostatic axial piston machine, starting from the pivot angle 0°, runs through the entire pivot angle range up to the maximum pivot angle, and the second hydrostatic axial piston machine, starting from the maximum pivot angle, runs through the entire pivot angle range up to the pivot angle 0°, and, to run through the second driving range, the first hydrostatic axial piston machine, starting from the maximum pivot angle, runs through the entire pivot angle range up to the pivot angle 0°, and the second hydrostatic axial piston machine, starting from the pivot angle 0°, runs through the entire pivot angle range up to the maximum pivot angle.

It is particularly beneficial if the first hydrostatic axial piston machine can be coupled to the input shaft via a fourth clutch, and if, for a temporary increase in traction, the first hydrostatic axial piston machine is coupled simultaneously to the ring wheel via the first clutch and to the input shaft via the fourth clutch.

Preferably, the clutches are designed as hydraulically actuated multiple-disk clutches and the clutches, when actuated, are acted upon by a shift pressure which depends on the high pressure prevailing in the hydraulic connection between the hydrostatic axial piston machines.

When the adjustment of the angles of the hydrostatic axial piston machines, the hydraulic connection between the two hydrostatic axial piston machines and the activation of the clutches take place via electromagnetic valves, and, for the electromagnetic valves, equivalent means are provided which, in the event of a failure of one or more of the electromagnetic valves, can be used in order to maintain essential functions of the power-branched transmission, an emergency driving program can be implemented in that, in the event of a failure of one or more of the electromagnetic valves, the associated equivalent means are used, in particular additional parallel-connected electromagnetic valves and/or equivalent coils for the electromagnetic valves being used as equivalent means.

BRIEF DESCRIPTION OF THE DRAWINGS

The invention will be explained in more detail below by means of exemplary embodiments, in conjunction with the drawing in which:

FIG. 5 shows a front view (FIG. 5a) and a "transparent" side view (FIG. 5b) of the pivot housing with the internal ducts of the axial piston machine from FIG. 4;

FIG. 7 shows a "transparent" illustration of the interior of the high-pressure block for the valve-controlled hydraulic connection of the two axial piston machines from FIG. 2 in a side view (FIG. 6a) and in a top view (FIG. 6b), in a first valve position;

FIG. 9 shows, in the type of illustration from FIG. 8, the control of the clutches and of the pivot angle of the axial piston machines in the two forward driving steps (FIG. 9($a1$)-($a3$) and FIG. 9($b1$)-($b3$)) and in one reverse step (FIG. 9$c$);

DETAILED DESCRIPTION OF THE INVENTION

Figure 1:
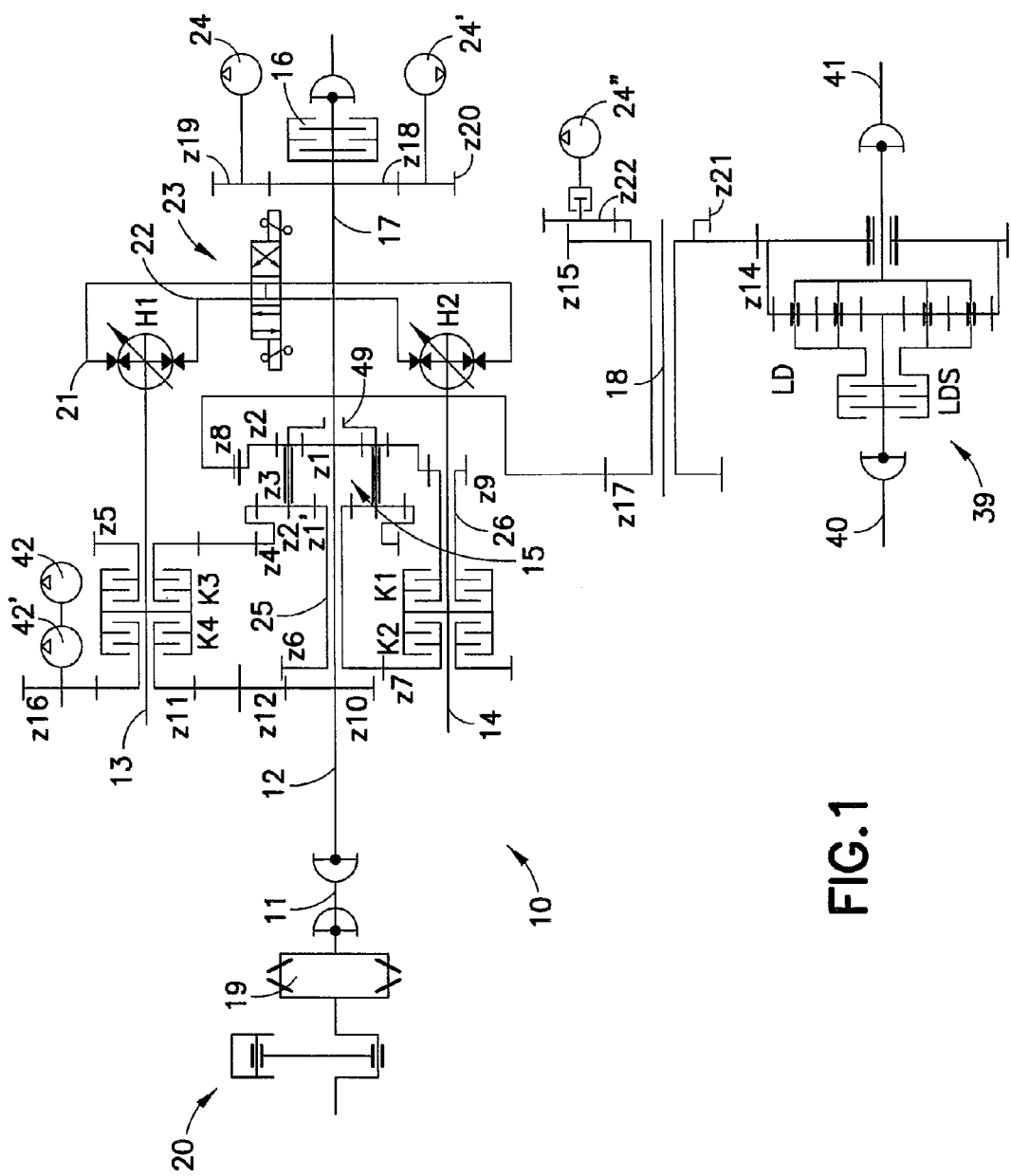
FIG. 1 shows the transmission diagram of a power-branched transmission for a tractor according to a preferred exemplary embodiment of the invention.

FIG. 1 illustrates the transmission diagram of a power-branched transmission for a tractor according to a preferred exemplary embodiment of the invention. The power-branched transmission 10 transfers the power of an internal combustion engine 20 which is symbolized in FIG. 1 by a piston seated on a crankshaft. The power-branched transmission 10 is connected to an input shaft (drive shaft) 12 via a cardan shaft 11 and to the internal combustion engine 20 via a torsion damper 19. It outputs the transferred power via an output shaft (driven shaft) 18 and an axial power divider. 39 with a longitudinal differential LD and with a longitudinal differential lock LDS to an axle connection 40 to the front axle and an axle connection 41 to the rear axle. Coupling between the output shaft 18 and the axial power divider 39 takes place via two intermeshing gearwheels z14 and z15.

A take-off shaft 17 extends through the power-branched transmission 10 and is a direct continuation of the input shaft 12. The take-off shaft 17 drives via gearwheels z18, z19 and z20 a first pump 24 for the working hydraulics and a second pump 24' for steering. Power can be taken off from the take-off shaft 17 from outside via a clutch 16. A third pump 24" for emergency steering is driven by the output shaft 18 via gearwheels z21, z22. Further pumps are the feed pump 42 and the lubricating-oil pump 42' which, seated on a common axle, are driven by the input shaft 12 via. the backgear consisting of gearwheels z16, z11, z12 and z10.

Figure 3:
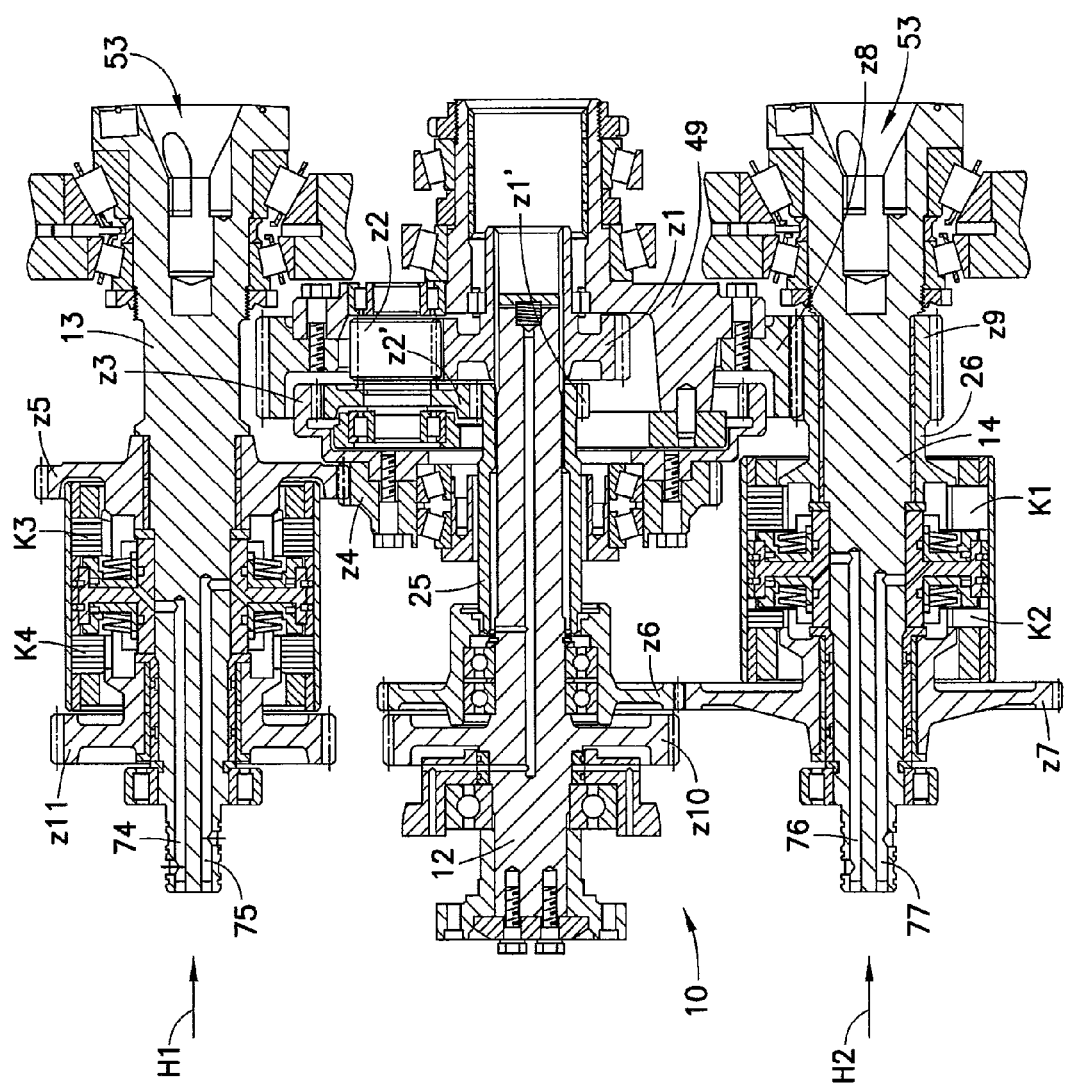
FIG. 3 shows a longitudinal section through the arrangement of the stepped planetary gear and of the two parallel hydrostatic axial piston machines cooperating therewith, from FIG. 2, along a plane passing through the three axes.

The core of the power-branched transmission 10 is formed by a stepped planetary gear 15 with a large sun wheel z1 and with a small sun wheel z1', with double planet wheels z2 and z2', the ring wheel z3, and with a planet web 49 connected fixedly in terms of rotation to a gearwheel z8 (see also FIG. 3 and 8), and by two hydrostatic axial piston machines H1 and H2, the driven shafts 13 and 14 of which can be coupled in each case via a pair of clutches K3, K4 and K1, K2 in different ways to the input shaft 12, the output shaft 18 and the stepped planetary gear 15. The hydrostatic axial piston machines H1 and H2, which operate selectively as a pump and as a motor, are connected hydraulically to one another via high-pressure lines 21, 22 which can be cross-switched by means of a multiway valve 23. The first axial piston machine H1 can be coupled with its driven shaft 13 to the ring wheel z3 by means of the clutch K3 via a backgear consisting of the gearwheel z5 and of a gearwheel z4 connected fixedly in terms of rotation to the ring wheel z3. It may, however, also be coupled to the input shaft 12 by means of the clutch K4 via the gearwheel z11, the intermediate wheel z12 and the gearwheel z10 arranged fixedly in terms of rotation on the input shaft 12. The second axial piston machine H2 can be coupled with its driven shaft 14 to the planet web 49 and consequently to the output shaft 18, on the one hand, by means of the clutch K1 via the hollow shaft 26 and the gearwheel z9 which is arranged fixedly in terms of rotation on the latter and which meshes with the gearwheel z8. It may, on the other hand, be coupled to the smaller sun wheel z1' of the stepped planetary gear 15 by means of the clutch K2 via the pair of gearwheels z7, z6 and the hollow shaft 25.

The power prevailing at the input shaft 12 is apportioned in the power-branched transmission 10 by means of the stepped planetary gear 15 to two power branches, to be precise a mechanical power branch and a hydraulic power branch, and is combined again later at the output shaft 18. The mechanical power branch runs from the input shaft 12 via the larger sun wheel z1 connected fixedly in terms of rotation to the input shaft 12, the double planet wheels z2, the planet web 49 and the gearwheel z8. The hydraulic power branch runs via the two hydraulically connected axial piston machines H1 and H2 and is designed differently according to the shifting of the clutches K1, . . . , K4.

Figure 8:
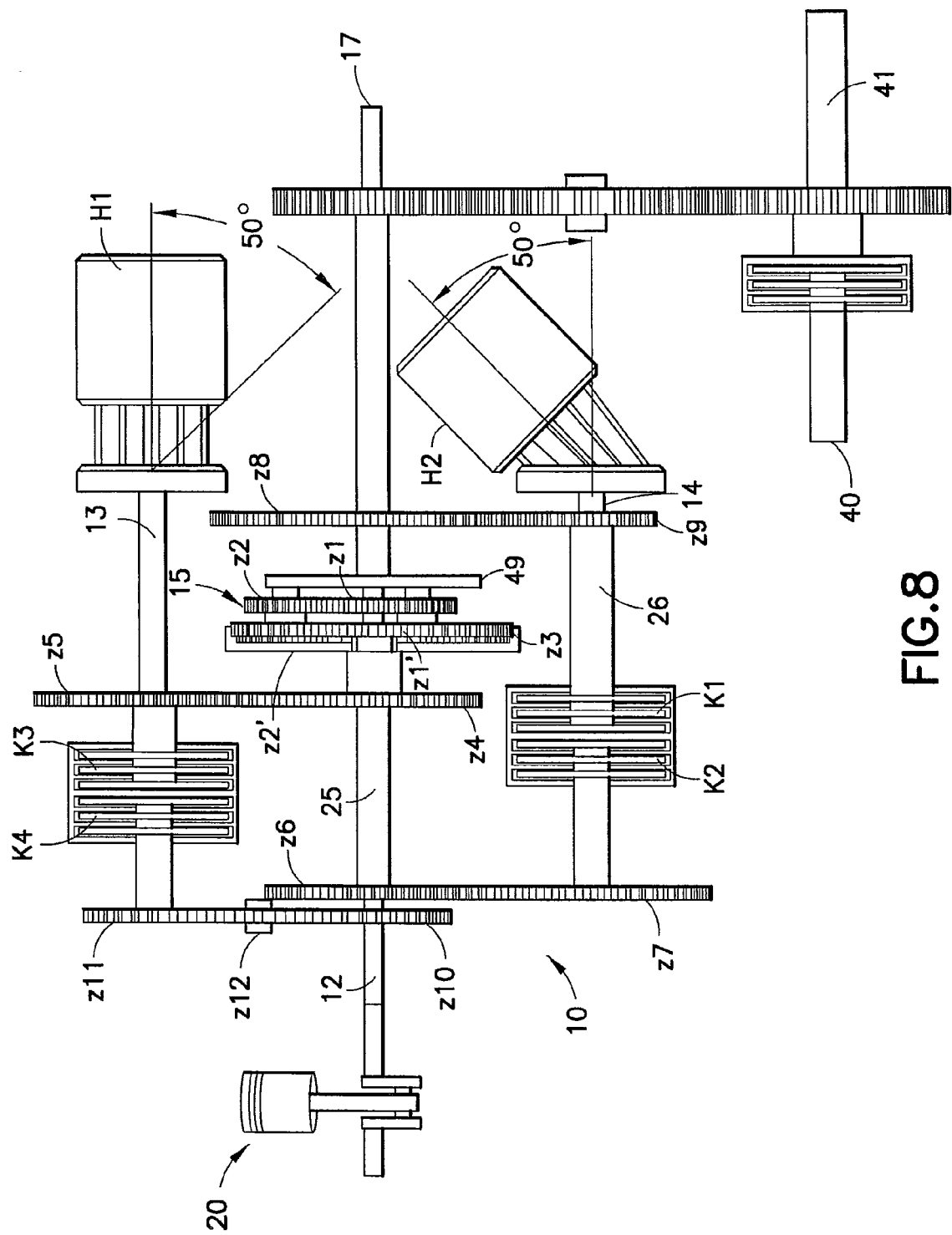
FIG. 8 shows a three-dimensional model illustration of the power-branched transmission from FIG. 2, the pivot angle of the two axial piston machines and the shift state of the two double clutches being revealed.

To explain the functioning of the power-branched transmission 10 from FIG. 1, this is reproduced once again in FIG. 8 in model form in a three-dimensional illustration. The output side between the gearwheel z8 and the axial connections 40, 41 is in this case illustrated in simplified form, as compared with FIG. 1. The same applies to the input side between the internal combustion engine 20 and the input shaft 12. The clutches K1, . . . , K4 are designed (as in FIG. 1) as multiple-disk clutches, and the hydrostatic axial piston machines H1, H2 are of the oblique-axis type, in which the cylinder block together with the pistons located in it can be pivoted out of the axis of the driven shafts 13, 14 to one side over a pivot angle, the maximum value of which is at least 45°, preferably 50° and above (what are known as "wide-angle hydrostats"). By means of the power-branched transmission 10 from FIG. 8 and the wide-angle hydrostats H1, H2, operation can be implemented in which forward drive can be covered overall by only two driving ranges or driving steps, at the upper end of which in each case the hydrostatic fraction of the transferred power approaches zero.

The shifting of the clutches K1, . . . , K4 and the pivoting position of the hydrostats H1, H2 for the various operating states of the transmission are illustrated in FIG. 9, FIG. 9(*a*1) to 9(*a*3) showing the first forward driving step, FIG. 9(*b*1) to 9(*b*3) the second forward driving step and FIG. 9(*c*) reverse drive. During starting (FIG. 9(*a*1)), as in the entire first forward driving step, the clutches K3 and K1 are actuated, so that the first hydrostat H1 is coupled to the ring wheel z3 of the stepped planetary gear 15 and the second hydrostat H2 is coupled to the planet web or the gearwheel z8 or the output shaft 18 (the driven side of the actuated clutch is in each case colored dark in FIG. 9). The first hydrostat H1, which operates as a pump in the first forward driving step, is first unpivoted (pivot angle 0°), whereas the second hydrostat H2 operating as a motor is pivoted out fully (maximum pivot angle). On account of the zero position of the first hydrostat H1, no pressure medium is pumped to the second hydrostat H2 and therefore no power is transferred hydraulically either. The starting operation is initiated in that the first hydrostat H1 is gradually pivoted, volume increasingly being pumped to the second hydrostat H2, and the second hydrostat beginning to rotate with a high torque and increasing speed. When the first hydrostat H1 is pivoted out fully (FIG. 9(*a*2)), the first phase of the first driving step is concluded. In the second phase, with the first hydrostat H1 pivoted out fully, the second hydrostat H2 is gradually moved back from the maximum pivot angle to the pivot angle 0° (FIG. 9(*a*3)), the rotational speed being increased ever further with a decreasing torque. At the end of the first driving step, the second hydrostat H2 no longer receives torque, and the rotational speed of the first hydrostat H1 approaches zero. The hydrostatically transferred power approaches zero, and the entire power is transferred mechanically.

At the transition from the first driving step to the second driving step (FIG. 9(*a*3)→FIG. 9(*b*1)) the clutch K1 is opened and the clutch K2 is closed. Since the second hydrostat H2 receives no torque at the pivot angle 0°, the changeover takes place virtually without shift torque. The second hydrostat H2 is then coupled to the smaller sun wheel z1' of the stepped planetary gear 15. With the changeover of the clutches K1 and K2, the multiway valve 23 (FIG. 1) is also changed over, so that the hydraulic connections between the two hydrostats H1 and H2 are interchanged. In the second driving step, the first hydrostat H1 operates as a motor and the second hydrostat H2 as a pump. As in the first driving step, the hydrostat operating as a pump (now the second hydrostat H2) in a first phase, starting from the pivot angle 0°, is gradually pivoted out to the maximum pivot angle (FIG. 9(*b*2)), while the hydrostat operating as a motor (now the first hydrostat H1) remains fully pivoted out. In a subsequent second phase (FIG. 9(*b*2)→FIG. 9(*b*3)), the first hydrostat H1 is then pivoted back into the zero position. At the end of the second driving step, the hydraulically transferred power again approaches zero; the entire power is transferred via the mechanical power branch.

Figure 10:
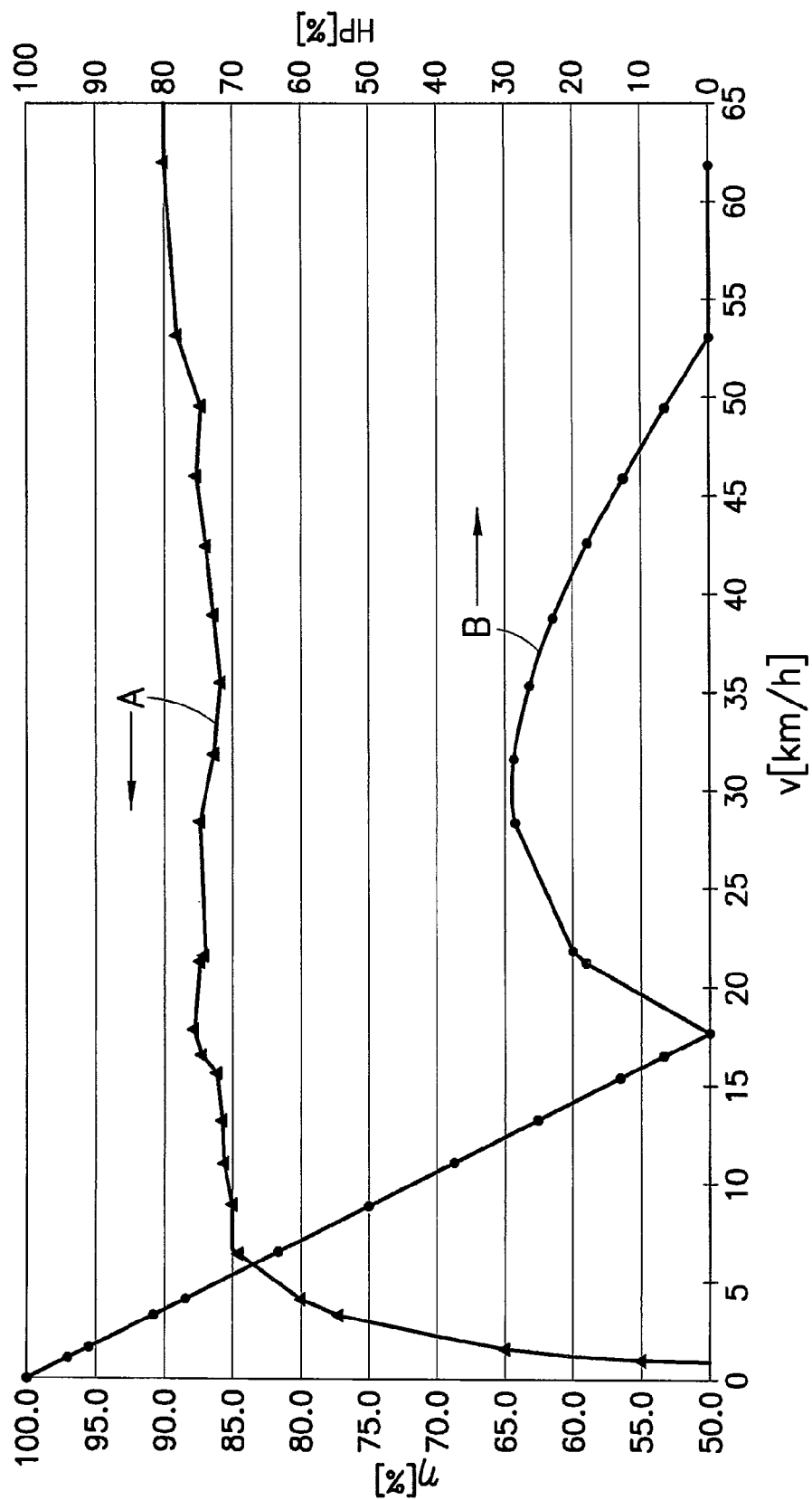
FIG. 10 shows a graph of the efficiency and of the percentage fraction of hydraulic power in the transferred power as a function of speed in the two forward driving steps of the transmission according to FIG. 1 and 2.

The graph obtained for a power branched transmission in a tractor according to FIG. 1 or FIG. 8, of the efficiency η in % and of the percentage fraction of the hydrostatically transferred power HP is reproduced in FIG. 10 as a function of the vehicle speed v. Curve A shows the profile of the efficiency η, and curve B shows the profile of the fraction of the hydrostatically transferred power. On account of the wide-angled hydrostats used in the transmission, the entire driving range extending from 0 to 63 km/h can be subdivided into only two driving steps, the first driving step extending from 0 to about 18 km/h and the second driving step from about 18 km/h to 63 km/h. In the first driving step, the fraction of the hydrostatically transferred power goes from an initial 100% linearly down to 0. In the second driving step, the fraction of the hydrostatically transferred power rises from 0 to a maximum of almost 30% (at about 30 km/h) and then falls (at about 53 km/h) to 0 and stays there until the upper end of the driving step. The result of this is that efficiency does not fall again until the end of the second driving step but, instead, even increases. This results, for high driving speeds maintained when driving long distances for a lengthy period of time, in a particularly good efficiency of the transmission which leads to markedly lowered operating costs.

In reverse drive (FIG. 9(*c*)), starting from the situation from FIG. 9(*a*1), there is a changeover from the clutch K3 to the clutch K4. The multiway valve 23 in the hydraulic connection between the hydrostats H1 and H2 is likewise changed over. The first hydrostat operating as a pump is then driven directly by the input shaft 12 and, starting from 0°, is gradually pivoted out. The fully pivoted-out second hydrostat H2 then receives rotational speed with high torque.

Figure 2:
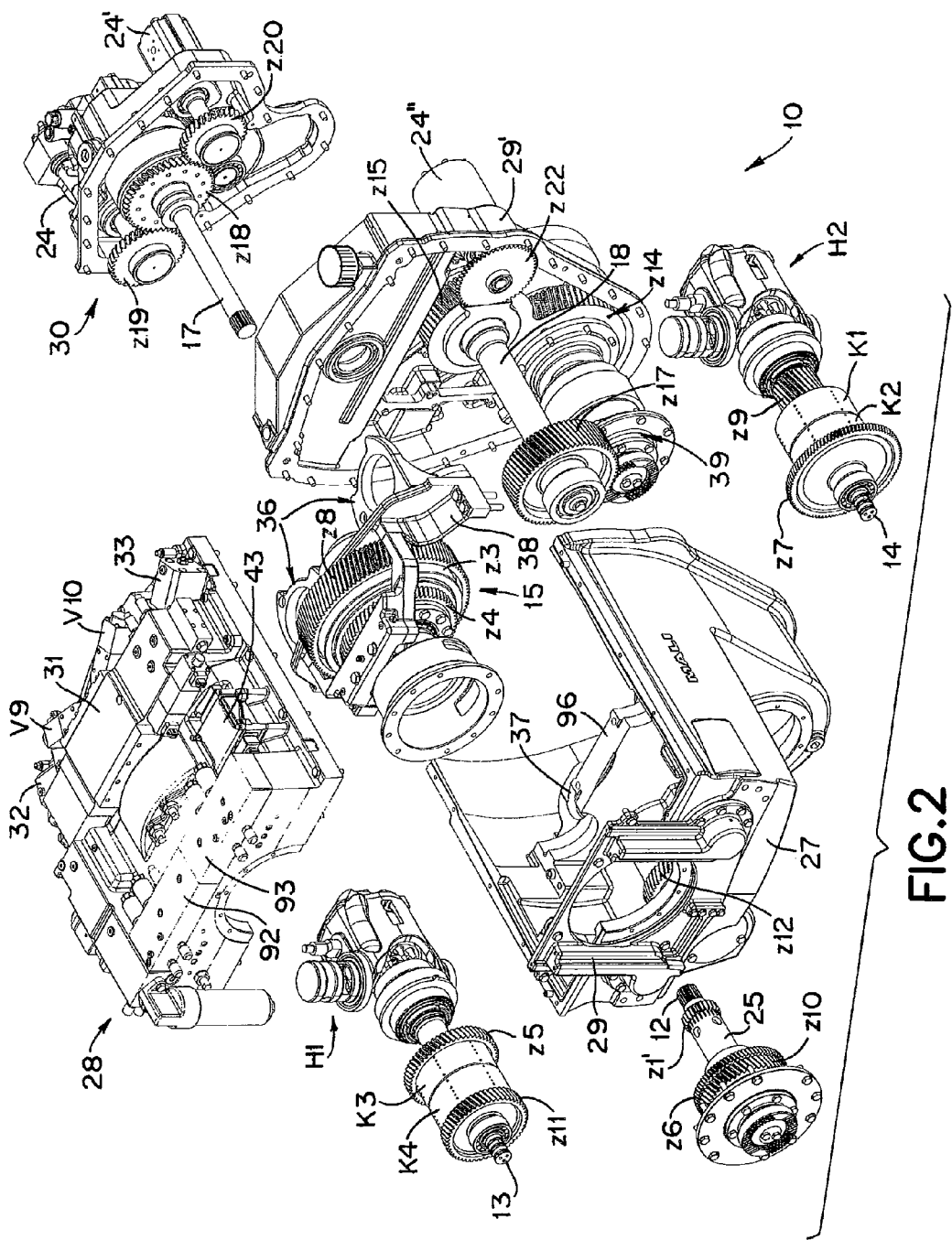
FIG. 2 shows an exploded illustration of the embodiment of a power-branched transmission according to the transmission diagram of FIG. 1.

A power-branched transmission implemented according to the transmission diagram from FIG. 1 is reproduced in an exploded illustration in FIG. 2. The power-branched transmission 10 is accommodated in a multipart housing which is composed of a trough-shaped housing lower part 27, a shallow housing upper part 28, a front housing cover 29 and a rear housing cover 29'. In the lowest part of the housing, the axial power divider 39 is arranged, which has an output forward and rearward for the front axle and the rear axle. Directly above the axle power divider 39, the stepped planetary gear 15 is fastened, axially parallel, to the side walls of the housing lower part 27 by means of an upper bearing bridge 38. On the rear part of the upper bearing bridge 38, two circular upper bearing orifices 36 are provided for receiving the upper bearing journals (46 in FIG. 4) of the pivot housings (44 in FIG. 4) of the hydrostats H1 and H2. Corresponding lower bearing orifices 37 for receiving the lower bearing journals (47 in FIG. 4) of the hydrostats H1 and H2 are arranged on a lower bearing bridge 96 which serves at the same time for mounting the two hydrostats H1 and H2. The hydrostats H1 and H2 are placed, axially parallel to the axle power divider 39, on both sides below the stepped planetary gear 15. They project with the front ends of their driven shafts 13 and 14 through the front wall of the housing lower part 27 and are connected there, by means of the front housing cover 29 equipped with corresponding connection devices, to a hydraulic control located in the housing upper part 28. The hydraulic control, comprising two valve plates 92, 93 with electromagnetic valves (V11, . . . , V15 in FIG. 11), activates the clutches K1, . . . , K4 seated on the. driven shafts 13, 14 via the hydraulic ducts 74, . . . , 77 (FIG. 3) running in the driven shafts 13, 14.

The rear housing cover 29' contains the pump 24" for emergency steering, which is driven by the output shaft 18. Flanged on the outside to the rear housing cover 29' is a drive unit which comprises the take-off shaft 17 and the two pumps 24 and 24' for the working hydraulics and the steering respectively.

The housing upper part 28 contains, in addition to the hydraulic control for the clutches K1, . . . , K4, further control and connection elements 31, . . . , 33 and V9, V10 for the hydrostats H1 and H2. The functioning and configuration of these control and connection elements depend on the internal construction of the hydrostats H1, H2 used. This internal construction is illustrated by the example of the hydrostat H1 in FIG. 4. The hydrostat H1 is an oblique-axis hydrostat with a driven shaft 13 rotating about a fixed axis 72 and with a cylinder block 70 which rotates about a pivotable axis 73 and which is mounted in a pivot housing 44. The pivot housing 44 with the cylinder block 70 can be pivoted about the pivot axis 45 by means of a pivot bolt 48.

Figure 4:
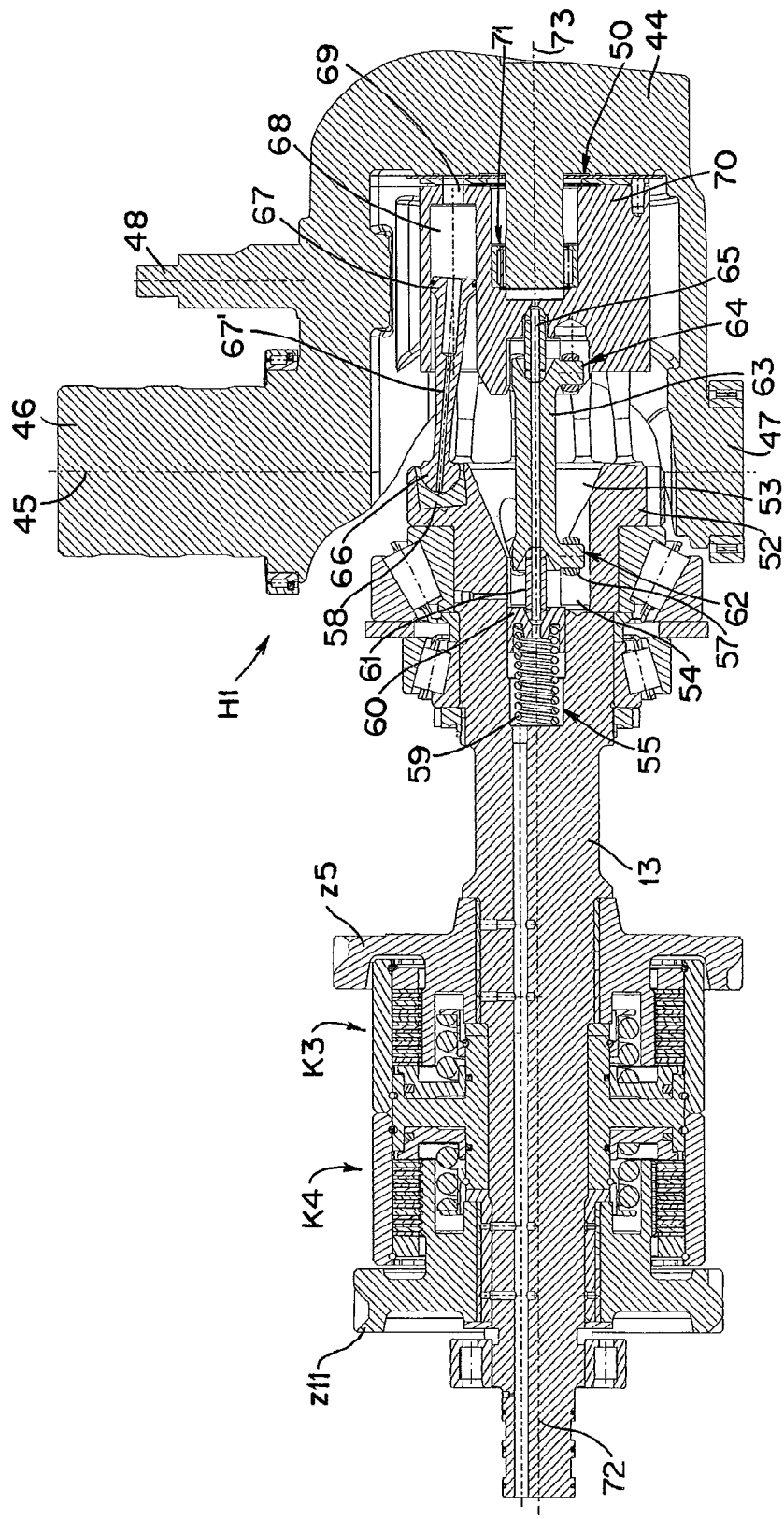
FIG. 4 shows a longitudinal section through one of the two hydrostatic axial piston machines, with attached double clutch, from FIG. 2.

The hydrostatic axial piston machine or hydrostat H1 of FIG. 4 comprises an elongate driven shaft 13, the cylinder block 70, a plurality of pistons 67 and a synchronizing shaft 63 for synchronizing the rotations of the driven shaft 13 and cylinder block 70. At one end, which faces the cylinder block 70, the driven shaft 13 is thickened and ends in a flange 52 concentric to the axis 72 of the driven shaft 13. Nine circular cylindrical bearing receptacles into which spherical bearings 58 for the pivotable mounting of the pistons 67 are inserted, are milled, distributed uniformly about the axis 72 on a partial circle, into the end face of the flange 52.

Provided in the center of the flange 52 is a funnel-shaped orifice 53 which merges, further inside the driven shaft 13, into a central bore 55 of stepped diameter. Three axially parallel bores 54 arranged in each case so as to each be rotated at 120° are introduced into the driven shaft 13 around the bore 55 so as to overlap partially with the bore 55 and are part of a first tripod joint 62. Comparable bores are present, opposite them, in the cylinder block 70 and are part of a second tripod joint 64. The two tripod joints 62 and 64 allow a rotationally fixed coupling of the synchronizing shaft 63 to the driven shaft 13 and the cylinder block 70 in the case of a simultaneous pivotability of the cylinder block 70 in relation to the flange 52 or the driven shaft 13. For this purpose, the synchronizing shaft 63 is equipped at each of the two ends with three radially oriented cylindrical journals which are arranged so as to be rotated through 120° and which, in the case of the first tripod joint 62 extend from the central bore 55 through the laterally open overlap region into the adjacent bores 54. A comparable engagement of the journals also takes place in the second tripod joint 64. To reduce the play, rings 57, crowned on the outside, are drawn onto the journals in each case.

When the cylinder block 70 is pivoted with respect to the flange 52, the distance to be bridged between the cylinder block 70 and the flange 52 by the synchronizing shaft 63 changes. So that this distance change can be compensated, the synchronizing shaft 63 is mounted displaceably in the axial direction in the region of the first tripod joint 62. The synchronizing shaft 63 is seated pivotably with its end facing the cylinder block 70 on a first pressure pin 65 which is inserted into the cylinder block 70 and projects with a portion of its length out of the cylinder block 70. So that the synchronizing shaft 63 does not come out of engagement with the cylinder block in the second tripod joint 64, it is pressed in the axial direction, with prestress, against the second pressure pin 61. A compression spring 59 accommodated in the bore 55 serves for generating the prestress and presses onto the synchronizing shaft 63 via an axially displaceable pressure piston 60 and a second pressure pin 61. The pressure piston 60, pressure pins 61, 65 and synchronizing shaft 63 have in each case a central oil duct.

The (cylindrical) cylinder block 70 has nine axially parallel cylinder bores 68 which are distributed uniformly about its axis 73 on a partial circle and which are in each case at an angular distance of 40° from one another. The cylinder bores 68 are designed, from the side facing the flange 52, as blind bores. The pistons 67, which are mounted pivotably in the flange 52, penetrate from this side into the cylinder bores 68. For this purpose, each piston 67 has an elongate, downwardly tapering piston shank 67' merging at the lower end into a spherical head 66 with which it is mounted pivotably in the associated spherical bearing 58. The cylinder block 70 can be pivoted by means of the pivot housing 44 about the pivot axis 45. The maximum pivot angle amounts to at least 45° and is preferably greater than or equal to 50°.

If, in the case of a constant pivot angle $\neq 0°$, the driven shaft 13 and consequently, via the synchronizing shaft 63, also the cylinder block 70, are rotated about their respective axes 72 and 73, each of the nine pistons 67 executes for each revolution a complete spoke cycle. The hydrodynamic axial piston machine H1 can in this case operate as a hydraulic pump when drive takes place via the driven shaft 13, and a hydraulic medium is sucked in by the pistons 67 moving out of the cylinder bore 68 and is pressed out by the pistons moving into the cylinder bore 68. The volumetric pumping capacity for each revolution is in this case the higher, the greater the pivot angle $\alpha$ is. It may, however, also operate as a hydraulic motor when the cylinders are acted upon in each case by a hydraulic medium under pressure, and when the rotational movement occurring is picked up at the driven shaft 13. In this case, the torque is the higher the greater the pivot angle is. If, by contrast, high rotational speeds are to be achieved at the driven shaft 13, the pivot angle must be made small.

The working space in the cylinder bores 68 which is delimited by the pistons 67 is accessible from the outer end face of the cylinder block 70 through connecting orifices 69. Through an axial bearing 50, the connecting orifices 69 of the cylinder bores 68 are successively connected, depending on the rotary position of the cylinder block 70, to a plurality of upper and lower orifices 82 and 83 in the adjacent pivot housing (FIG. 5(a)). The upper and lower orifices 82 and 83 in the pivot housing 44 are connected to an upper and lower connecting duct 80 and 81 (FIG. 5(b)). The connecting ducts 80, 81 produced by casting run in the pivot housing 44 from the upper and lower orifices 82, 83 upward into the upper bearing journal 46 where they end in connecting orifices 78, 79 arranged one above the other and are separated by cylindrical sealing surfaces 97. According to FIG. 6 and 7, the hydraulic connection between the two hydrostats H1, H2 can be made via the connecting orifices 78, 79 and 78', 79' in the upper bearing journals 46 and 46' of the two hydrostats H1 and H2.

Figure 6A:
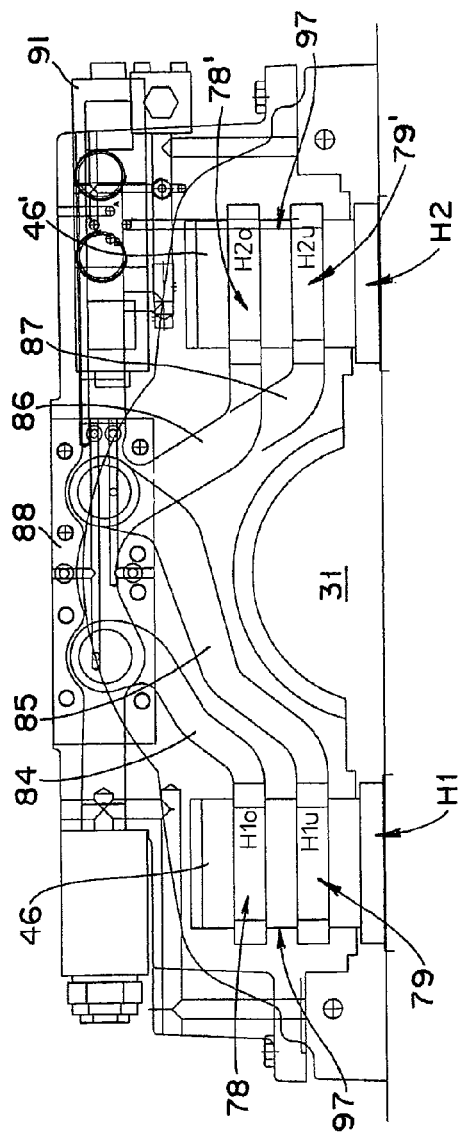
FIG. 6 shows a "transparent" illustration of the interior of the high-pressure block for the valve-controlled hydraulic connection of the two axial piston machines from FIG. 2 in a side view (FIG. 6a) and in a top view (FIG. 6b), and in a first valve position.
Figure 6B:
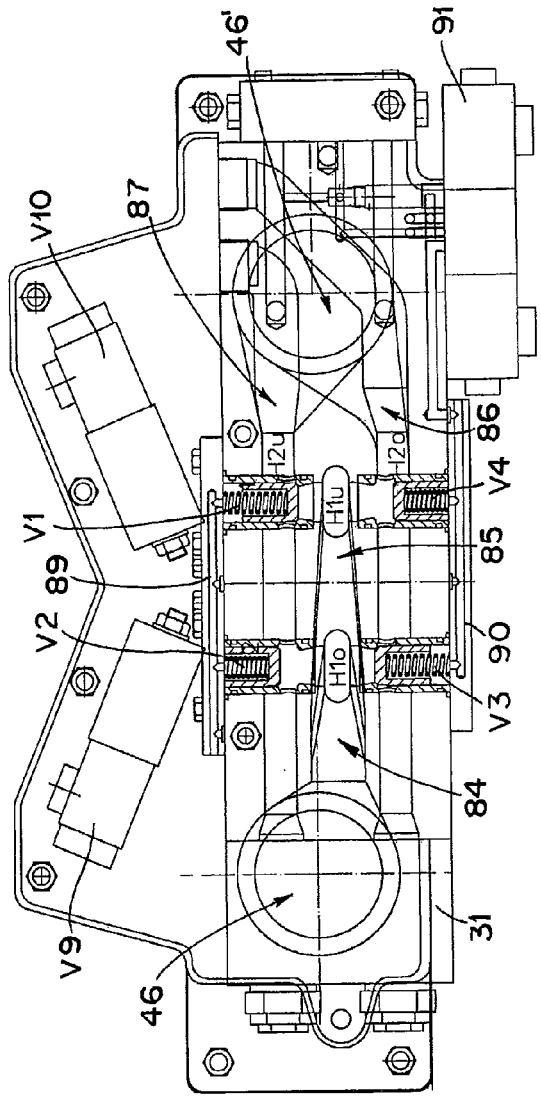

A high-pressure block 31 arranged on the housing upper part 28 serves for making (and controlling) the hydraulic connection between the hydrostats H1 and H2 (FIG. 2, 6 and 7). According to FIG. 6(a) and 7(a), the two hydrostats H1, H2 project with their upper bearing journals 46, 46' into corresponding bores in the high-pressure block 31. Within the high-pressure block 31, high-pressure ducts 84, . . . , 87 are formed by casting, which, in the region of the upper bearing journals 46, 46', end in two annular chambers which lie one above the other, are sealed off with respect to one another at the sealing surfaces 97 and are connected to the connecting orifices 78, 78', 79, 79' of the upper bearing journals 46, 46'. The high-pressure ducts 84, . . . , 87 lead from the upper bearing journals 46, 46' to a valve block 88 which is arranged in the middle of the high-pressure block 31 and where they can be connected selectively to one another by means of four hydraulically actuable valves V1, . . . , V4. The valves V1, . . . , V4 are accommodated in transversely running bores, in which in each case a piston is pressed with spring pressure against a sealing surface. The valves V1, . . . , V4 open counter to the spring pressure when the high-pressure ducts, 84, . . . , 87 are acted upon by high pressure. They can be closed by means of a counterpressure with which the pistons of the valves V1, . . . , V4 are acted upon from the rear via laterally flanged-on activation plates 89, 90. The counterpressure is controlled by means of an electromagnetic control valve 91.

The valves V1, . . . , V4 in the valve block 88 are activated in pairs. In the illustration of FIG. 6, the valves V1 and V4 are open, whereas the valves V2 and V3 are closed. In this case, the upper connecting orifice 78 of the first hydrostat H1 (H1O) is connected via the high-pressure ducts 84 and 87 and the valve V1 to the lower connecting orifice 79' of the second hydrostat (H2u). The lower connecting orifice 79 of the first hydrostat H1 (H1u) is likewise connected via the high-pressure ducts 85 and 86 and the valve V4 to the upper connecting orifice 78' of the second hydrostat H2 (H2o). This valve switching (V1, V4 open, V2, V3 closed) illustrated in FIG. 6, is provided for the first driving step of the transmission, in which the first hydrostat H1 operates as a pump and the second hydrostat H2 as a motor. In the second driving step, according to FIG. 7, the conditions are reversed: the valves V1 and V4 are closed, whereas the valves V2 and V3 are open. In this case, the two lower connecting orifices 79 and 79' and the two upper connecting orifices 78 and 78' are in each case connected to one another.

Supply lines are led outward in the high-pressure block 31 from the high-pressure ducts 86, 87, so that the pressures prevailing in the ducts can be measured and monitored via pressure transducers. Other supply lines make it possible to supply hydraulic medium into the circuit existing between the hydrostats H1, H2. Arranged behind the high-pressure block 31, on the housing upper part 28, are two oblique hydraulic cylinders 32, 33 which are activated by electromagnetic valves V9 and V10 and which engage on the pivot bolts 48 (FIG. 4) which project into the housing upper part 28 and which are arranged at a radial distance from the pivot axis 45 on the pivot housing 44 of the hydrostats H1, H2.

Figure 11:
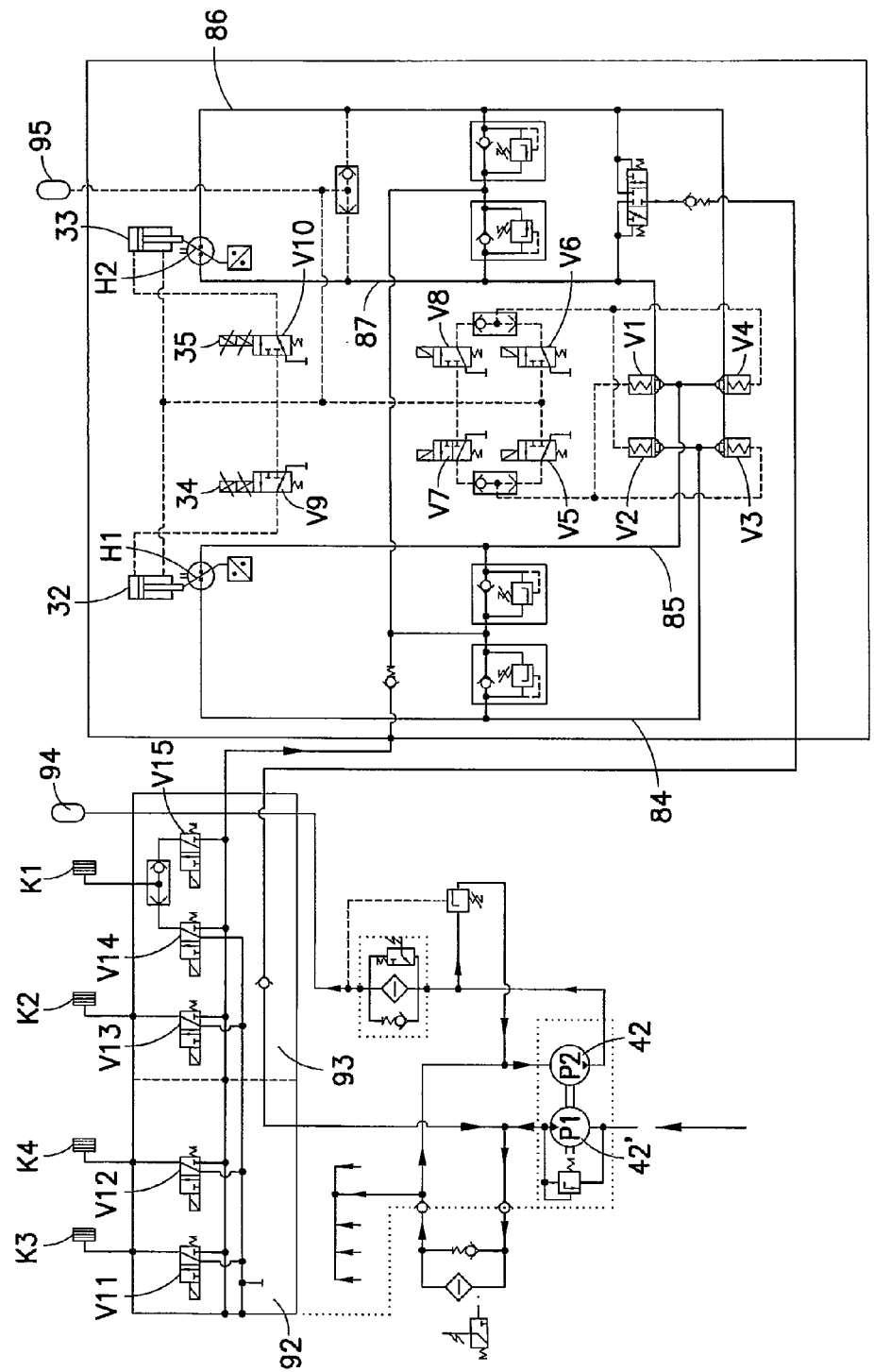
FIG. 11 shows a simplified hydraulic diagram of the power-branched transmission according to FIG. 2.

The resulting hydraulic diagram of the power-branched transmission 10 from FIG. 1-7 is reproduced in simplified form in FIG. 11. The necessary lubricating-oil and feed pressure is generated by a lubricating-oil pump 42' and a following feed pump 42. The feed pressure is available at a first pressure accumulator 94. It is used for actuating the clutches K1, . . . , K4, control taking place via the valves V11, . . . , V15 which are accommodated in the valve plates 92, 93 and which are designed as electromagnetic multiway valves. The clutch K1 can be actuated, for redundancy reasons by two identical valves V14 and V15 which are interconnected by means of a shuttle valve. The pressure accumulator 94 for the feed pressure is connected via nonreturn valves having antiparallel-connected pressure limiters to the high-pressure ducts 84, . . . , 87 in the high-pressure block 31 which can be interconnected in the way already described by means of the valves V1, . . . , V4. The valves V1, . . . , V4 are activated in pairs via electromagnetic valves V5 and V6, to which further valves V7 and V8 are connected in parallel as redundant equivalent valves by means of shuttle valves.

A second pressure accumulator 95 is connected via a shuttle valve to the two pressure ducts 86 and 87. The pressure for actuating the valves V1, . . . , V4 is extracted from this pressure accumulator 96. The two hydraulic cylinders 32, 33 for pivoting the hydrostats H1 and H2 are also actuated by means of the same pressure. To control the hydraulic cylinders 32, 33, the electromagnetic valves V9 and V10 (FIG. 6, 7) are used which, for redundancy reasons, have additional equivalent coils 34, 35.

The overall control and monitoring of the transmission as a function of the engine data and of the torque and driving speed requirements and also the changeover to an emergency driving program in the event of a failure of specific control elements are assumed by an electronic transmission control unit 43 (FIG. 2) which is placed in the immediate vicinity of the measurement transducers (for pressure, rotational speed and valve position, etc.) and control valves on the housing upper part 28. Integrating the control and monitoring functions of the transmission, including the switchable high-pressure ducts 84, . . . , 87 for the hydraulic connection of the hydrostats H1, H2 into the housing upper part 28 results in a highly compact transmission construction, at the same time with high operating reliability. Owing to the built-in redundancy, in the event of a failure of specific control elements, an emergency driving program can be implemented which in most cases allows further travel without restriction, and in other cases ensures at least restricted driving home or to the nearest garage. If, for example, the main coils of the valves V9 and/or V10 for controlling the hydraulic cylinders 32 and 33 fail, further travel without restrictions can be ensured, using the equivalent coils 34 and/or 35 (or using complete equivalent valves). The same also applies to the situation where the valve V12 for activating the clutch K1 fails, because the equivalent valve V15 then can assume its role. If the activation for the clutch K2 fails, driving can still take place in the first driving step (and in reverse). If the activation of the clutch K3 fails, a restricted forward drive without the second driving step (and unrestricted reverse drive) can be implemented by the engagement of the clutch K4 and the simultaneous changeover of the valves V1, . . . , V4. If the activation of the clutch K4 fails, forward drive is not restricted. Restricted reverse drive is then achieved by the activation of the clutch K3. If one of the valves V5 and V6 for the high-pressure duct changeover fails, full drivability can be restored, using the corresponding equivalent valve V7 or V8.

Finally, because of the special configuration of the power-branched transmission 10, it is conceivable, within the framework of transmission control, to achieve a temporary increase in traction by the simultaneous closing of the clutches K3 and K4, since additional mechanical force transmission thereby becomes effective.

The invention claimed is:

1. A power-branched transmission comprising a stepped planetary gear for apportioning the power prevailing at an input shaft to a mechanical power branch and a hydraulic power branch provided between the input shaft and an output shaft, wherein the hydraulic power branch is formed by two identical hydrostatic axial piston machines which are connected hydraulically to one another and which can be operated selectively as a pump or as a motor and are pivotable in a predetermined pivot angle range, and at least one of which, to cover different driving ranges or driving steps, is selectively connected to the input shaft via a clutch or the stepped planetary gear via another clutch, wherein the two hydrostatic axial piston machines are designed as wide-angle hydrostats with a pivot angle range of at least 45°.

2. The power-branched transmission as claimed in claim 1, wherein the two hydrostatic axial piston machines have a pivot angle range of at least 50°.

3. The power-branched transmission as claimed in claim 1, wherein the stepped planetary gear comprises double planet wheels mounted rotatably on a planet web and having a smaller gearwheel and a larger gearwheel which mesh with a larger sun wheel and with a smaller sun wheel and which run with the larger gearwheel in a ring wheel, in that the larger sun wheel is coupled to the input shaft, in that the first hydrostatic axial piston machine can be coupled to the ring wheel via a first clutch and to the input shaft via a second clutch, in that the second hydrostatic axial piston machine can be coupled to the planet web via a third clutch, and to the smaller sun wheel via a fourth clutch, and in that the output shaft is coupled to the planet web.

4. The power-branched transmission as claimed in claim 3, wherein the larger sun wheel is seated fixedly in terms of rotation on the input shaft, in that a first spur wheel is flanged to the planet web, and in that a second spur wheel, which meshes with the first spur wheel, is arranged fixedly in terms of rotation on the output shaft.

5. The power-branched transmission as claimed in claim 4, wherein a third spur wheel is flanged to the ring wheel, and the coupling of the first hydrostatic axial piston machine by means of the first clutch takes place via a fourth spur wheel which meshes with the third spur wheel, in that a fifth spur wheel is arranged fixedly in terms of rotation on the input shaft and the coupling of the first hydrostatic axial piston machine by means of the second clutch takes place via a sixth spur wheel and a reversing wheel which meshes with the fifth spur wheel and with the sixth spur wheel, in that the coupling of the second hydrostatic axial piston machine by means of the third clutch takes place via a seventh spur wheel which meshes with the first spur wheel, and in that the smaller sun wheel is connected fixedly in terms of rotation to an eighth spur wheel via a hollow shaft surrounding the input shaft, and the coupling of the second hydrostatic axial piston machine by means of the fourth clutch takes place via a ninth spur wheel which meshes with the eighth spur wheel.

6. The power-branched transmission as claimed in claim 5, wherein the input shaft is connected fixedly in terms of rotation to a coaxial take-off shaft which passes through the power-branched transmission.

7. The power-branched transmission as claimed in claim 1, wherein the hydrostatic axial piston machines are equipped in each case with a driven shaft, in that the clutches are designed as hydraulically actuable multiple-disk clutches and arranged on the driven shafts, and in that the clutches are actuated via axial hydraulic ducts running in the driven shafts.

8. The power-branched transmission as claimed in claim 1, wherein the input shaft, the stepped planetary gear, the two hydrostatic axial piston machines and the output shaft are accommodated in a common housing.

9. The power-branched transmission as claimed in claim 8, wherein the two hydrostatic axial piston machines can be connected hydraulically to one another via high-pressure ducts running in the housing.

10. The power-branched transmission as claimed in claim 9, wherein the housing comprises a housing lower part and a housing upper part, in that, on the housing upper part a high-pressure block is arranged in which the high-pressure ducts are accommodated, in that the two hydrostatic axial piston machines in each case comprise a cylinder block with a plurality of cylinder bores and with pistons mounted displaceably therein, which cylinder block is mounted in a pivot housing rotatably about a horizontal axis, in that the pivot housings are mounted in each case with an upper bearing journal in the high-pressure block pivotably about a vertical pivot axis, and in that the cylinder bores are connected to the high-pressure ducts in the high-pressure block via connecting ducts running in the pivot housing into the upper bearing journals.

11. The power-branched transmission as claimed in claim 10, wherein, in each of the two hydrostatic axial piston machines, the cylinder bores of the cylinder block which lie above a horizontal mid-plane can be connected to an upper connecting duct via upper orifices in the pivot housing and the cylinder bores of the cylinder block which lie below the horizontal mid-plane can be connected to a lower connecting duct via lower orifices in the pivot housing, in that the upper connecting ducts are connected to first high-pressure ducts and the lower connecting ducts to second high-pressure ducts in the high-pressure block, and in that the first and the second high-pressure ducts can be connected selectively to one another by means of valves accommodated in the high-pressure block.

12. The power-branched transmission as claimed in claim 11, wherein the first and second high-pressure ducts in the high-pressure block are produced by casting and in that the valves are designed as hydraulically actuable valves and are accommodated in bores which are introduced into the high-pressure block transversely to the high-pressure ducts.

13. The power-branched transmission as claimed in claim 12, wherein the hydraulically actuable valves are activated in pairs via first electromagnetic valves.

14. The power-branched transmission as claimed in claim 13, wherein, for redundancy reasons, a second electromagnetic valve is in each case connected in parallel to the first electromagnetic valves or an electromagnetic equivalent coil is assigned to the first electromagnetic valves.

15. The power-branched transmission as claimed in claim 10, wherein, in each case a pivot bolt is arranged on the pivot housings of the hydrostatic axial piston machines at a predetermined radial distance from the upper bearing journal, and in that hydraulic cylinders are provided on the housing upper part, and engage on the pivot bolts in order to pivot the pivot housings.

16. The power-branched transmission as claimed in claim 15, wherein the hydraulic cylinders are activated via third electromagnetic valves, and in that, for redundancy reasons, the third electromagnetic valves are assigned in each case an electromagnetic equivalent coil.

17. The power-branched transmission as claimed in claim 7, wherein the clutches are activated via electromagnetic valves, in that the electromagnetic valves are accommodated in valve plates flanged to the housing, and in that the hydraulic connection between the electromagnetic valves and the clutches takes place via ducts running in the housing.

18. The power-branched transmission as claimed in claim 17, wherein one of the clutches is provided for coupling the second hydrostatic axial piston machine to the output shaft, and in that, for redundancy reasons, a further electromagnetic valve is connected in parallel to the electromagnetic valve assigned to this clutch.

19. A method for the operation of a power-branched transmission as claimed in claim 1, wherein the adjustment of the angles of the hydrostatic axial piston machines, the hydraulic connection between the two hydrostatic axial piston machines and the activation of the clutches take place in such a way that the forward drive is subdivided into two successive driving ranges and in that the fraction of the power transferred via the hydraulic branch approaches zero in each case at the end of each of the two driving ranges.

20. The method as claimed in claim 19, wherein the stepped planetary gear comprises double planet wheels mounted rotatably on a planet web and having a smaller gearwheel and a larger gearwheel which mesh with a larger sun wheel and with a smaller sun wheel and which run with the larger gearwheel in a ring wheel, in that the larger sun wheel is coupled to the input shaft, and the output shaft is coupled to the planet web, in that, in the first driving range, the first hydrostatic axial piston machine is coupled to the ring wheel via a first clutch and the second hydrostatic axial piston machine is coupled to the planet web via a second clutch, and the first hydrostatic axial piston machine is operated as a pump and the second hydrostatic axial piston machine as a motor, and in that, in the second driving range, the first hydrostatic axial piston machine is coupled to the ring wheel via the first clutch and the second hydrostatic axial piston machine is coupled to the smaller sun wheel via a third clutch, and the first hydrostatic axial piston machine is operated as a motor and the second hydrostatic axial piston machine as a pump.

21. The method as claimed in claim 20, wherein, to run through the first driving range, the first hydrostatic axial piston machine, starting from the pivot angle 0°, runs through the entire pivot angle range up to the maximum pivot angle, and the second hydrostatic axial piston machine, starting from the maximum pivot angle, runs through the entire pivot angle range up to the pivot angle 0°, and in that, to run through the second driving range, the first hydrostatic axial piston machine, starting from the maximum pivot angle, runs through the entire pivot angle range up to the pivot angle 0°, and the second hydrostatic axial piston machine, starting from the pivot angle 0°, runs through the entire pivot angle range up to the maximum pivot angle.

22. The method as claimed in claim 20, wherein the first hydrostatic axial piston machine can be coupled to the input shaft via a fourth clutch, and in that, for a temporary increase in traction, the first hydrostatic axial piston machine is coupled simultaneously to the ring wheel via the first clutch and to the input shaft via the fourth clutch.

23. The method as claimed in claim 19, wherein the clutches are designed as hydraulically actuated multiple-disk clutches and in that the clutches, when actuated, are acted upon with a shift pressure which depends on the high pressure prevailing in the hydraulic connection between the hydrostatic axial piston machines.

24. The method as claimed in claim 19, wherein the adjustment of the angles of the hydrostatic axial piston machines, the hydraulic connection between the two hydrostatic axial piston machines and the activation of the clutches take place via electromagnetic valves, in that, for the electromagnetic valves, equivalent means are provided which, in the event of a failure of one or more of the electromagnetic valves, can be used in order to maintain essential functions of the power-branched transmission, and in that, in the event of a failure of one or more of the electromagnetic valves, the equivalent means are used.

25. The method as claimed in claim 24, wherein additional parallel-connected electromagnetic valves and/or equivalent coils for the electromagnetic valves are used as equivalent means.

26. The power-branch transmission as claimed in claim 1, wherein the transmission is used for agricultural vehicles.

27. The power-branch transmission as claimed in claim 26, wherein the agricultural vehicle is a tractor.

* * * * *